US012574833B2

(12) United States Patent
 Andreasen et al.

(10) Patent No.:  US 12,574,833 B2
(45) Date of Patent:  Mar. 10, 2026

(54) AUTO-CONFIGURATION OF PRIVATE MOBILE NETWORK FOR OPERATIONAL TECHNOLOGY (OT) PROCESSING FOR INDUSTRIAL DEVICES

(71) Applicant: Cisco Technology, Inc., San Jose, CA (US)

(72) Inventors: Flemming Stig Andreasen, Marlboro, NJ (US); Robert Edgar Barton, Richmond (CA); Timothy Peter Stammers, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 619 days.

(21) Appl. No.: 17/983,928

(22) Filed: Nov. 9, 2022

(65) Prior Publication Data

US 2024/0155474 A1      May 9, 2024

(51) Int. Cl.
 *H04W 48/18*      (2009.01)
 *H04W 28/24*      (2009.01)
(52) U.S. Cl.
 CPC ........... *H04W 48/18* (2013.01); *H04W 28/24* (2013.01)
(58) Field of Classification Search
 CPC .............................. H04W 48/18; H04W 28/24
 See application file for complete search history.

(56) References Cited

U.S. PATENT DOCUMENTS

| | | |
|---|---|---|
| 8,588,109 B2 | 11/2013 | Li et al. |
| 10,743,080 B2 | 8/2020 | Dai et al. |
| 10,805,401 B2 | 10/2020 | Livanos et al. |
| 11,392,115 B2 | 7/2022 | Szigeti et al. |

(Continued)

FOREIGN PATENT DOCUMENTS

| | | |
|---|---|---|
| EP | 3447987 A1 | 2/2019 |
| EP | 3554108 A1 | 10/2019 |

OTHER PUBLICATIONS

Varga, P. et al., "5G support for Industrial IoT Applications—Challenges, Solutions, and Research gaps," PMC, https://www.ncbi.nlm.nih.gov/pmc/articles/PMC7038716/, retrieved Aug. 11, 2022, 55 pages.

(Continued)

*Primary Examiner* — Elton Williams
(74) *Attorney, Agent, or Firm* — Edell, Shapiro & Finnan, LLC

(57)      ABSTRACT

In one illustrative example, a controller for use in a private mobile network may determine network service requirements for an industrial device. The controller may select, from a set of network slices, a subset of network slices having network service requirement configurations that most closely support the network service requirements. Each network slice of the set may be associated with an affinity ranking value that is indicative of a service performance of the network slice for industrial device operation in a cell or a zone associated with a zone or security level value assigned to the industrial device. The controller may identify, from the subset of network slices, a selected network slice associated with a best affinity ranking value for the zone or security level value assigned to the industrial device. The controller may assign the selected network slice and associated service parameters for the communications of the industrial device.

20 Claims, 10 Drawing Sheets

(56) References Cited

U.S. PATENT DOCUMENTS

| 2017/0230832 | A1 | | 8/2017 | Ophir et al. | |
|---|---|---|---|---|---|
| 2019/0289020 | A1 | | 9/2019 | Heintel et al. | |
| 2019/0387401 | A1 | | 12/2019 | Liao et al. | |
| 2020/0177462 | A1 | | 6/2020 | Jia et al. | |
| 2020/0275281 | A1 | | 8/2020 | Bordeleau et al. | |
| 2020/0280499 | A1 | | 9/2020 | Patil et al. | |
| 2020/0389843 | A1 | * | 12/2020 | Huang | H04W 60/04 |
| 2021/0014778 | A1 | | 1/2021 | Xi | |
| 2021/0051069 | A1 | | 2/2021 | Stammers et al. | |
| 2021/0136653 | A1 | | 5/2021 | Zhang | |
| 2021/0194760 | A1 | | 6/2021 | Barton et al. | |
| 2021/0250853 | A1 | | 8/2021 | Corston-Petri et al. | |
| 2021/0400524 | A1 | | 12/2021 | Kahn et al. | |
| 2022/0046484 | A1 | | 2/2022 | Örtenblad et al. | |
| 2022/0225175 | A1 | | 7/2022 | Srivastava et al. | |
| 2022/0232579 | A1 | | 7/2022 | Lee | |
| 2022/0255805 | A1 | | 8/2022 | Hausermann et al. | |
| 2022/0263718 | A1 | | 8/2022 | Khanfouci | |
| 2022/0263820 | A1 | | 8/2022 | Barton et al. | |
| 2022/0321467 | A1 | | 10/2022 | Szigeti et al. | |
| 2022/0386147 | A1 | * | 12/2022 | Majjiga | G08G 5/22 |
| 2023/0180004 | A1 | | 6/2023 | Jin et al. | |

OTHER PUBLICATIONS

3GPP, "3rd Generation Partnership Project; Technical Specification Group Services and System Aspects; , Procedures for the 5G System (5GS); Stage 2 (Release 17)," Technical Specification, 3GPP TS 23.502 V17.4.0, Mar. 2022, 738 pages.

3GPP, 3rd Generation Partnership Project; Technical Specification Group Services and System Aspects; System architecture for the 5G System (5GS); Stage 2 (Release 17), Technical Specification, 3GPP TS 23.501 V17.4.0, Mar. 2022, 567 pages.

Cisco, "Wireless Device Profiling and Policy Classification Engine on WLC," https://www.cisco.com/c/en/us/td/docs/wireless/controller/technotes/7-5/NativeProfiling75.html, retrieved Nov. 7, 2022, 46 pages.

Patil, S. et al., "Iot Device Policy Management Framework in SG/4G Cellular Networks," Technical Disclosure Commons, Defensive Publications Series, https://www.tdcommons.org/dpubs_series/128, Jun. 25, 2018, 8 pages.

Bryes, E., "Using ISA/IEC 62443 Standards to Improve Control System Security," Tofino Security, White Paper, Version 1.2, May 2014, 12 pages.

"Control Point Discovery (CPD)", Cisco, OL-14657-01, Aug. 21, 2007, 26 Pages.

"Control Point Discovery Interface Specification", PacketCable™ 2.0, PKT-SP-CPD-102-061013, Oct. 13, 2006, 64 Pages.

"Lawful Intercept Architecture", Cisco, Nov. 2024, pp. 1-14.

"LI Support for IPoE Sessions," Cisco, Retrieved from https://www.cisco.com/c/en/us/td/docs/ios-XML/ios/sec_usr_cfg/configuration/xe-16-11/sec-usr-cfg-xe-16-11-book/sec-lawful-intercept-IPoE.pdf, Apr. 2019, pp. 1-4.

* cited by examiner

AUSF: AUTHENTICATION SERVER FUNCTION
NEF: NETWORK EXPOSURE FUNCTION
NRF: NETWORK REPOSITORY FUNCTION
PCF: POLICY CONTROL FUNCTION
NSSF: NETWORK SLICE SELECTION FUNCTION
UDM: UNIFIED DATA MANAGEMENT

222

220B

INDUSTRIAL
INTERNET OF THINGS
(IIOT) DEVICES

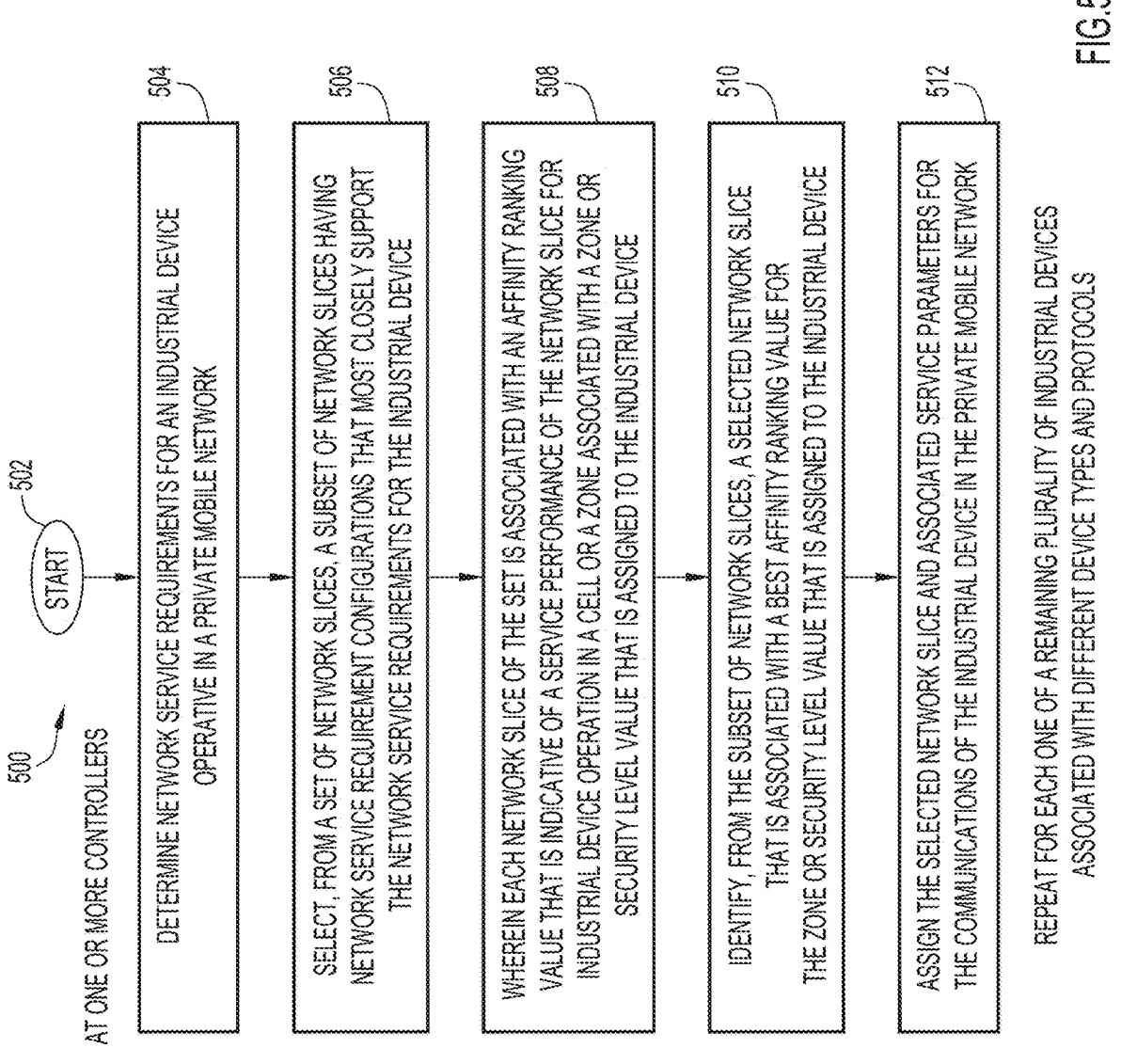

AT ONE OR MORE CONTROLLERS

DETERMINE NETWORK SERVICE REQUIREMENTS FOR AN INDUSTRIAL DEVICE OPERATIVE IN A PRIVATE MOBILE NETWORK

SELECT, FROM A SET OF NETWORK SLICES, A SUBSET OF NETWORK SLICES HAVING NETWORK SERVICE REQUIREMENT CONFIGURATIONS THAT MOST CLOSELY SUPPORT THE NETWORK SERVICE REQUIREMENTS FOR THE INDUSTRIAL DEVICE

WHEREIN EACH NETWORK SLICE OF THE SET IS ASSOCIATED WITH AN AFFINITY RANKING VALUE THAT IS INDICATIVE OF A SERVICE PERFORMANCE OF THE NETWORK SLICE FOR INDUSTRIAL DEVICE OPERATION IN A CELL OR A ZONE ASSOCIATED WITH A ZONE OR SECURITY LEVEL VALUE THAT IS ASSIGNED TO THE INDUSTRIAL DEVICE

IDENTIFY, FROM THE SUBSET OF NETWORK SLICES, A SELECTED NETWORK SLICE THAT IS ASSOCIATED WITH A BEST AFFINITY RANKING VALUE FOR THE ZONE OR SECURITY LEVEL VALUE THAT IS ASSIGNED TO THE INDUSTRIAL DEVICE

ASSIGN THE SELECTED NETWORK SLICE AND ASSOCIATED SERVICE PARAMETERS FOR THE COMMUNICATIONS OF THE INDUSTRIAL DEVICE IN THE PRIVATE MOBILE NETWORK

REPEAT FOR EACH ONE OF A REMAINING PLURALITY OF INDUSTRIAL DEVICES ASSOCIATED WITH DIFFERENT DEVICE TYPES AND PROTOCOLS

FIG.5

500
502 START
504
506
508
510
512

AFFINITY RANKING TABLE
(E.G., RANGE = 1 TO 10)

700

| | ZONE / LEVEL 1 | ZONE / LEVEL 2 | ZONE / LEVEL 3 | ZONE / LEVEL 4 | ZONE / LEVEL 5 |
|---|---|---|---|---|---|
| NETWORK SLICE A | 1 | 1 | 7 | 8 | 5 |
| NETWORK SLICE B | 3 | 3 | 3 | 5 | 1 |
| NETWORK SLICE C | 8 | 4 | 2 | 1 | 7 |
| NETWORK SLICE D | 3 | 6 | 1 | 3 | 3 |

FIG.7

AUTO-CONFIGURATION OF PRIVATE MOBILE NETWORK FOR OPERATIONAL TECHNOLOGY (OT) PROCESSING FOR INDUSTRIAL DEVICES

TECHNICAL FIELD

The present disclosure relates generally to telecommunications systems, and more particularly to techniques and mechanisms for automatically determining network service requirements for industrial devices operative in a private mobile network and configuring the private mobile network based on the network service requirements for subsequent operational technology (OT) processing in relation to the industrial devices.

BACKGROUND

Per the Industrial Automation and Control System (IACS) Purdue model, Industrial Internet of Things (IIoT) networks are typically divided into cells and zones, where a zone may be tied to a particular Operational Technology (OT) process (e.g., manufacturing a door). To support the OT process, a variety of different industrial devices, such as sensors, actuators, Programmable Logic Controllers (PLCs), Human Machine Interfaces (HMIs), etc., may be involved, and different protocols will be in use between such industrial devices. Some of the industrial devices will have strict timing and reliability requirements, and some of the industrial devices will not.

When using private Fifth Generation (5G) ("private 5G") for such IIoT networks, different IIoT assets and their associated applications may have different network service requirements. The network service requirements depend not only on the industrial device, but also where and how the industrial device is used (e.g., per the IACS Purdue model). Furthermore, a given industrial device may have multiple interfaces and support different protocols with different needs (e.g., real-time process monitoring versus administrator access).

OT customers are typically not networking experts—let alone 5G experts. Hence, expressing these communication needs in networking terms as well as configuring the network to accommodate these needs may be quite challenging. A more automated solution is needed whereby network service requirements may be determined automatically or semi-automatically, such that the underlying private 5G network may configured accordingly.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a flowchart for describing a method for use in automatically determining network service requirements for industrial devices operative in a private mobile network, and automatically configuring the private mobile network based on the network service requirements for subsequent OT processing in relation to the industrial devices, according to some implementations of the present disclosure;

FIG. 7 is an example of an affinity ranking table of a plurality of affinity ranking values, which indicate affinity rankings between each one of the set of network slices and each one of a plurality of zone or security level values.

DESCRIPTION OF EMBODIMENTS

Figure 1A:
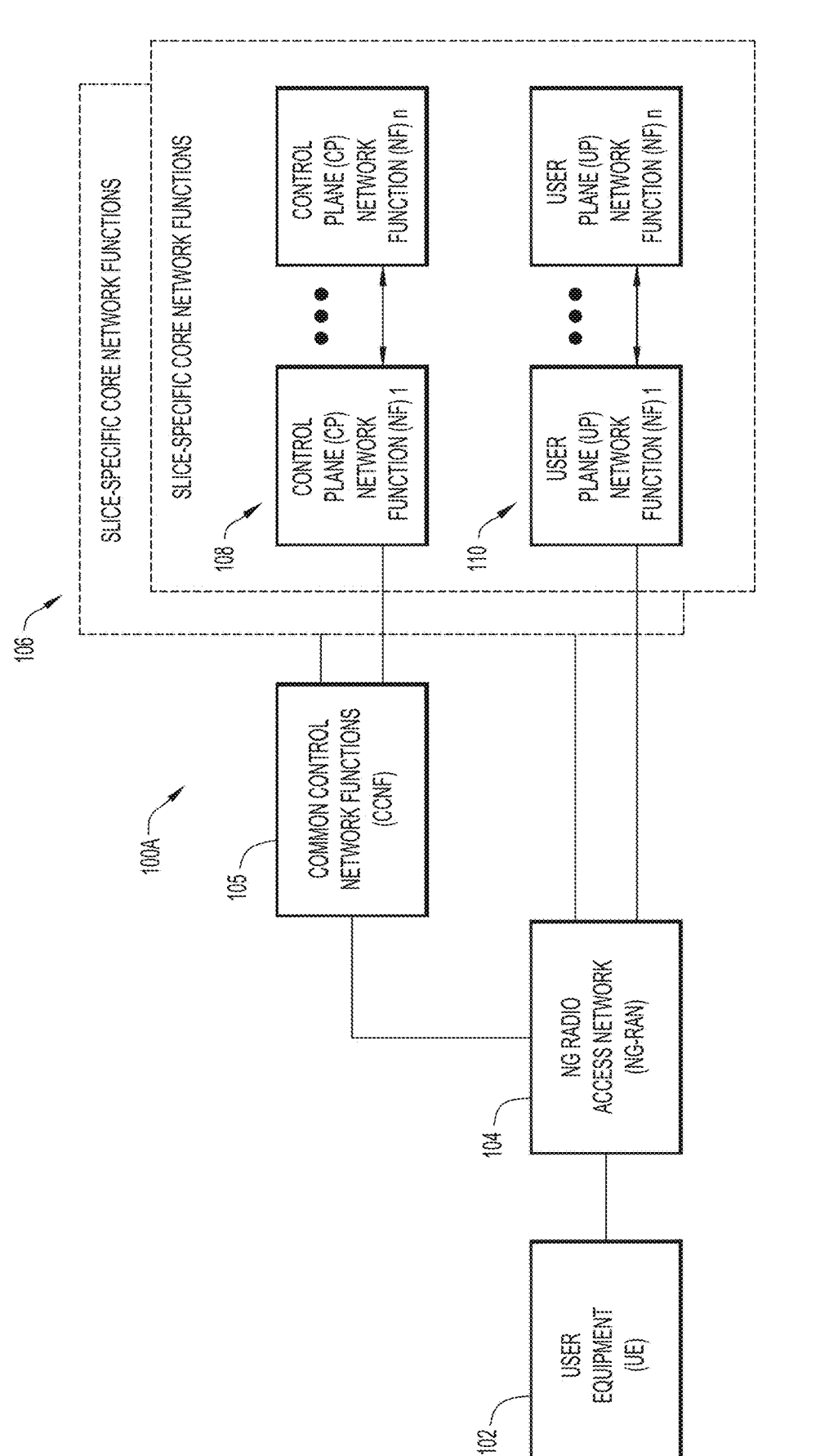
FIG. 1A is an illustrative representation of a basic network architecture of a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms are described herein for automatically determining network service requirements for industrial devices operative in a private mobile network and configuring the private mobile network based on the network service requirements, for subsequent operational technology (OT) processing in relation to the industrial devices.

In one illustrative example, a method is described for configuring a private mobile network for communications of an industrial device in the private mobile network which is operative to provide a set of network slices for OT processing in relation to industrial devices. The method may include determining network service requirements for an industrial device operative for communications in the private mobile network; selecting, from the set of network slices, a subset of network slices having network service requirement configurations that most closely support the network service requirements for the industrial device, wherein each network slice of the set is associated with an affinity ranking value that is indicative of a service performance of the network slice for industrial device operation in a cell or a zone associated with a zone or security level value that is assigned to the industrial device; identifying, from the subset of network slices, a selected network slice that is associated with a best affinity ranking value for the zone or security level value that is assigned to the industrial device; and assigning the selected network slice and associated service parameters for the communications of the industrial device in the private mobile network.

In some implementations, each network slice in the set of network slices includes a plurality of user plane functions, each one of the plurality of user plane functions in each network slice is assigned to a respective one of a plurality of zone or security level values, and the selected network slice includes a user plane function that is assigned with the zone or security level value of the industrial device. In some further implementations, the assigning of the selected network slice further includes assigning the user plane function that is assigned with the zone or security level value of the industrial device for the communications of the industrial device; and configuring the associated service parameters in the user plane function for the communications of the industrial device. In some implementations, the plurality of zone or security level values are defined according to an Industrial Automation and Control System (IACS) Purdue model or an International Electrotechnical Commission (IEC) 62443 standard.

In some implementations, the method further involves maintaining access to a stored table of a plurality of affinity ranking values which comprise affinity rankings between each one of the set of network slices and each one of a plurality of zone or security level values. Each affinity ranking value associated with a given network slice and a given zone or security level value may be indicative of the service performance of the given network slice for industrial device operation in a cell or a zone associated with the given zone or security level value.

In some implementations, the method may further include obtaining, based on a device type and a protocol of the industrial device, device profile information and application flow information for the industrial device, where the determining may further involve determining the network service requirements for the industrial device based on the device profile information and the application flow information of the industrial device. In some further implementations, the application flow information may include expected traffic behavior information of the industrial device and observed traffic behavior information of the industrial device. In yet further implementations, the method may further include monitoring an application flow of the industrial device for obtaining the observed traffic behavior information of the industrial device.

In some implementations, the method may include repeating the determining, the selecting, the identifying, and the assigning, for each one of a remaining plurality of industrial devices operative in the private mobile network. In some further implementations, the method may be an automatic or semi-automatic method for initially configuring the private mobile network for the communications of the industrial device and the remaining plurality of industrial devices in the private mobile network.

In relation to the above-described method(s), a computing device may comprise one or more processors; one or more memory elements coupled to the one or more processors; one or more interfaces to connect to a mobile network for communication; instructions stored in the one or more memory elements, where the instructions are executable on the one or more processors for operation as a controller, including for performing the processing/messaging steps of the method(s) as described. In addition, a computer program product may comprise a non-transitory computer readable medium and instructions stored in the non-transitory computer readable medium, where the instructions are executable by one or more processors of controller for performing the processing/messaging steps of the method(s) as described.

More detailed and alternative techniques and implementations are provided herein as described below.

EXAMPLE EMBODIMENTS

FIG. 1A is an illustrative representation of a general network architecture 100A of a Fifth Generation (5G) network. The 5G network may be referred to more generally herein as a mobile network or a Third Generation Partnership Project (3GPP) based mobile network.

As illustrated in FIG. 1A, network architecture 100A of the 5G network includes common control network functions (CCNF) 105 and a plurality of slice-specific core network functions 106. With network architecture 100A, the 5G network may be configured to facilitate communications for a UE 102. UE 102 may obtain access to the 5G network via a radio access network (RAN) or a Next Generation (NG) RAN (NG-RAN) 104. NG-RAN 104 may include one or more base stations or gNodeBs (gNBs), such as a gNB 107. UE 102 may be any suitable type of device, such as a cellular telephone, a smart phone, a tablet device, an Internet of Things (IoT) device, an Industrial IoT (IIoT) device, a Machine-to-Machine (M2M) device, a sensor, etc.

Network architecture 100A of the 5G network includes a Service-Based Architecture (SBA) which may provide a modular framework from which common applications can be deployed using components of varying sources and suppliers. The SBA of the 5G network may be configured such that control plane functionality and common data repositories are provided by way of a set of interconnected NFs, each with authorization to access each other's services.

Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an Access and Mobility Management Function (AMF) and a Network Slice Selection Function (NSSF). UE-level mobility management, authentication, and network slice instance selection are examples of functionalities provided by CCNF 105. On the other hand, slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a Session Management Function (SMF), whereas UP NFs 110 may include, for example, a User Plane Function (UPF).

Figure 1B:
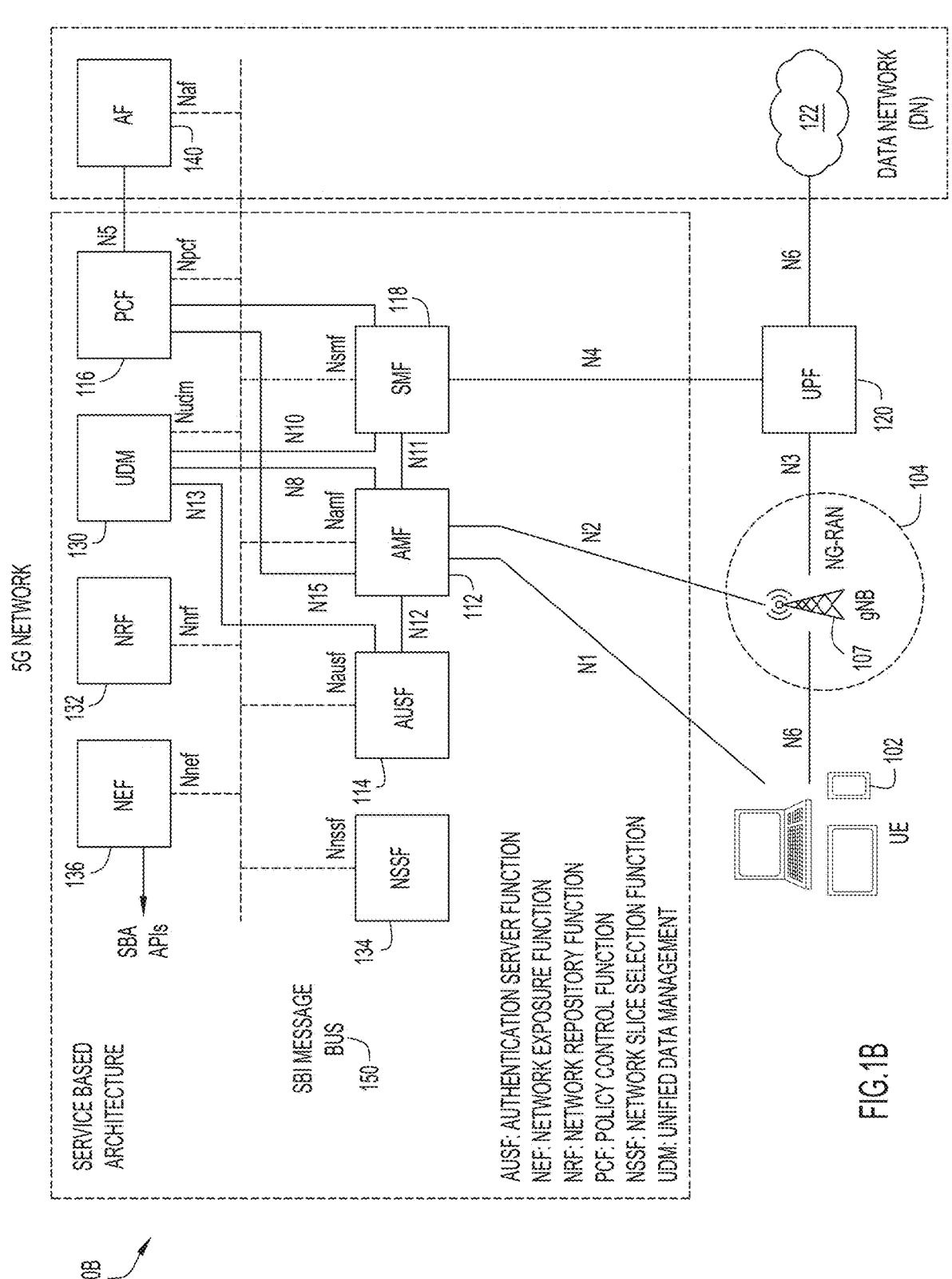
FIG. 1B is an illustrative representation of a more detailed network architecture of the 5G network of FIG. 1A.

FIG. 1B is an illustrative representation of a more detailed network architecture 100B of the 5G network of FIG. 1A. As provided in 3GPP standards for 5G (e.g., 3GPP Technical Specification or "TS" 23.501 and 3GPP TS 23.502), network architecture 100B for the 5G network may include an AMF 112, an Authentication Server Function (AUSF) 114, a Policy Control Function (PCF) 116, an SMF 118, and a UPF 120 which may connect to a Data Network (DN) 122. Other NFs in the 5G network include an NSSF 134, a network exposure function (NEF) 136, an NF repository function (NRF) 132, and a UDM 130. A plurality of interfaces and/or reference points N1-N8, N10-N13, and N15 shown in FIG.

1B (as well as others) may define the communications and/or protocols between each of the entities, as described in the relevant (evolving) standards documents.

In FIG. 1B, UPF 120 is part of the user plane and all other NFs (i.e., AMF 112, AUSF 114, PCF 116, SMF 118, and UDM 130) are part of the control plane. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling. For communications of UE 102 via UPF 120, SMF 118 may maintain a Packet Forward Control Protocol (PFCP) session with UPF 120 over an N4 interface. An N4 connection may be established for every Protocol Data Unit (PDU) session that is created by UE 102 so that SMF 118 may control the session.

The SBA of the 5G network is better illustrated in FIG. 1B, again whereby the control plane functionality and common data repositories are provided by way of the set of interconnected NFs. Assuming the role of either service consumer or service producer, NFs may be self-contained, independent and reusable. With the SBA, each NF service may expose its functionality through a Service Based Interface (SBI) message bus 150. SBI message bus 150 may employ a Representational State Transfer (REST) interface (e.g., using Hypertext Transfer Protocol "HTTP" 2.0). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for an application function (AF) 140.

The 5G network has a network architecture that employs network slicing, which enables the multiplexing of virtualized and independent logical networks on the same physical network infrastructure. Each network slice is an isolated end-to-end network tailored to fulfil diverse requirements requested by a particular application. A logical, end-to-end network slice may have predetermined capabilities, traffic characteristics, and service level agreements (SLAs), and may include the virtualized resources required to service the needs of a Mobile Virtual Network Operator (MVNO) or group of subscribers. NSSF 134 assists in facilitating network slicing in the 5G network, as it operates to select network slice instances (NSIs) for UEs.

UDM 130 may provide services to SBA functions, such as AMF 112, AUSF 114, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context. AUSF 114 provides for authentication, and may rely on a backend service for computing authentication data and keying materials.

NRF 132 may store and/or maintain NF profiles of available NF instances and their associated services, and support a service discovery function for service discovery associated with the NF profiles. In general, an NF instance is an identifiable instance of an NF. NF profiles of NF instances maintained in NRF 132 may include NF instance ID, NF type (e.g., AMF, SMF, PCF, UPF, etc.), network slice identifiers such as NSI ID, NF capacity information, names of supported services, etc. For service discovery, NRF 132 may receive a discovery request from an NF instance and provide information associated with the discovered NF instance to the NF instance in response. As described further herein, an NRF may store and/or maintain zone or security level values in association with UEs and/or UPFs as well as other related information.

One or more application functions, such as AF 140, may connect to the 5G network. AF 140 may interact with the network via NEF 136 in order to access network capabilities. NEF 136 may securely expose network capabilities and events provided by NFs to AF 140, and may provide a means for AF 140 to securely provide information to the 5G network.

For enterprises, interest in deploying private 5G networks for "private 5G" is growing. Such enterprise deployments may include mission-critical devices, IoT devices, robotics devices, etc., where application or device-specific Quality of Service (QoS) treatment, latency, and reliability are important considerations.

Figure 2A:
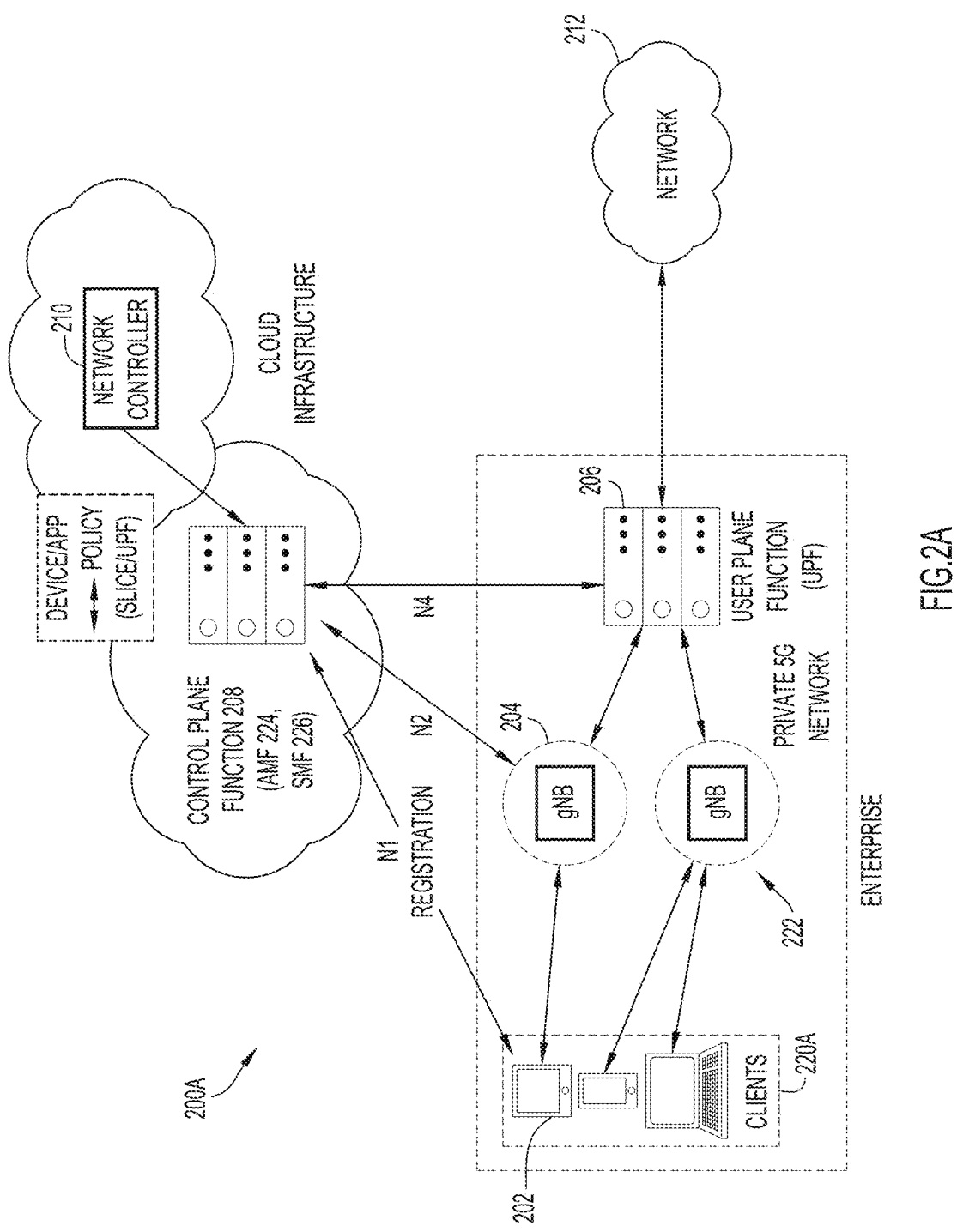
FIG. 2A is an illustrative representation of a basic network architecture of a private 5G network for an enterprise.

In industrial-type private 5G networks ("industrial 5G"), security considerations are also important considerations. To illustrate, FIG. 2A is an illustrative representation of a general network architecture 200A of a private 5G network for an enterprise. In general, the private 5G network may utilize the network architecture 200A to facilitate communications for a plurality of clients or UEs 220A, such as a UE 202. Operation, functionality, and protocols utilized in the private 5G network of FIG. 2A may generally conform to 3GPP standards for 5G (e.g., 3GPP TS 23.501 and 23.502), except where specifically adapted for the private enterprise and described herein. A plurality of interfaces and/or reference points N1, N2, and N4 of FIG. 2A are indicative of the protocols and/or the communications between at least some of the entities.

In FIG. 2A, UE 202 may obtain access to the private 5G network via one or more base stations or gNBs 222, such as a gNB 204. A UPF 206 may be used to carry traffic for UE 202. For example, UPF 206 may carry uplink (UL) and downlink (DL) traffic between UE 202 in the private 5G network and a network 212. A control plane function(s) 208 of a control plane may be utilized in the private 5G network for access and mobility management, session management, and/or policy management and control for UEs. In particular, control plane function 208 may include an AMF 224 and an SMF 226 or like functions. In an illustrative example, SMF 226 may manage a protocol data unit (PDU) session of UE 202 that is anchored at UPF 206 over an N4 interface using a Packet Forwarding Control Protocol (PFCP).

In the private 5G context, AMF 224 and SMF 226 may be implemented as separate functions or components, or alternatively provided together as an integrated functionality (in whole or in part) and/or co-located at the same node or component. Other functions may be provided or utilized as well, such as an UDM, an NRF, and Identity Service Engine (ISE), etc. In some implementations, control plane function 208 is provided locally in the private 5G network. In other implementations, control plane function 208 is provided (at least in part) in a cloud infrastructure.

A network controller 210 may also be provided for managing the private 5G network. More specifically, network controller 210 may be provided in the private 5G network for managing and controlling policy and configuration in the private 5G network. In some implementations, network controller 210 is provided locally in the private 5G network. In other implementations, network controller 210 is provided as part of a cloud infrastructure. The cloud infrastructure having network controller 210 may be referred to as a cloud manager or a management cloud. In some implementations, network controller 210 in the cloud infrastructure is operative to provide management and control over policy and configuration according to intent-based networking.

Figure 2B:
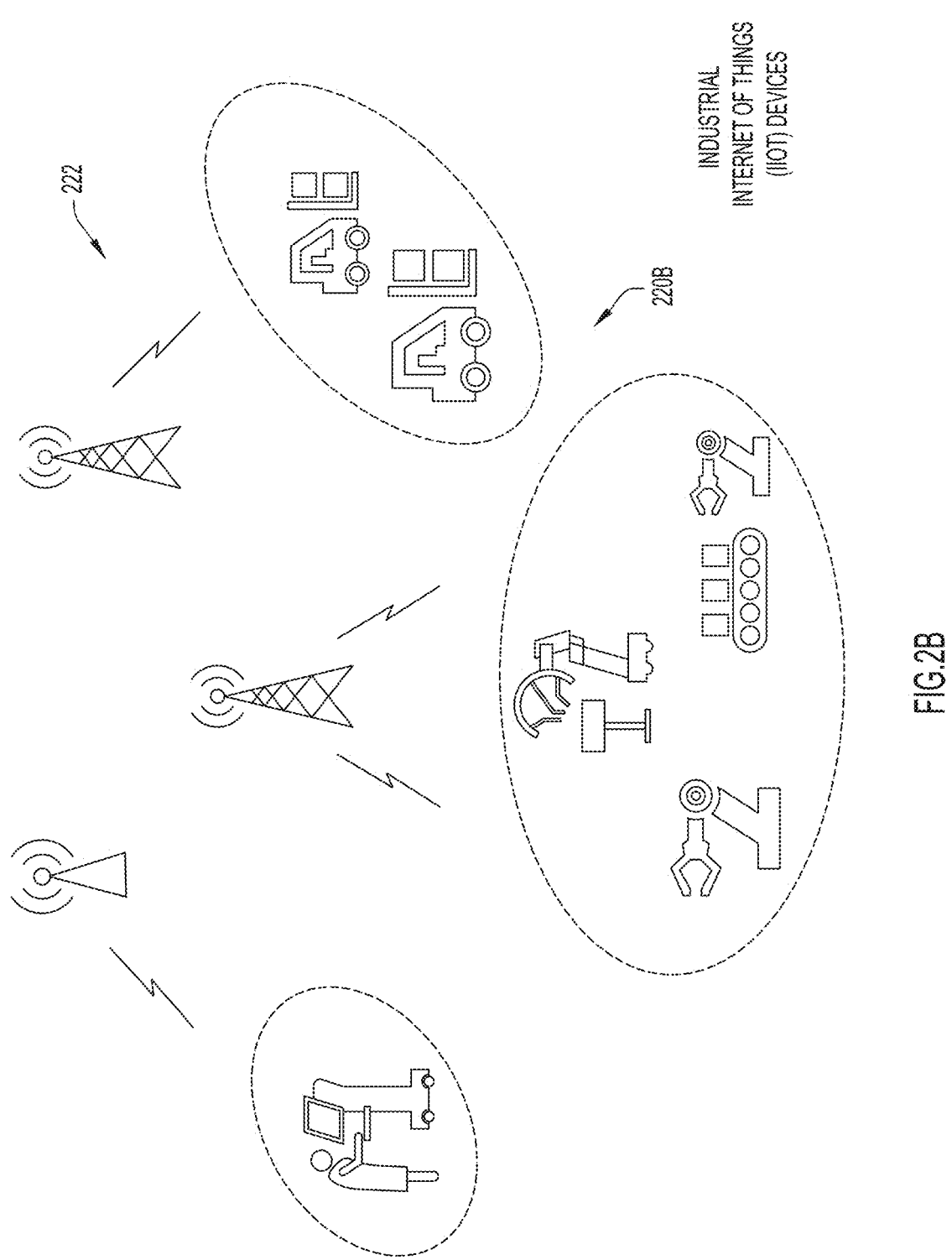
FIG. 2B is an illustrative example of an industrial network environment having a plurality of industrial devices which may operate in the private 5G network as part of an industrial control system (ICS)

In industrial private 5G networks, the UEs may be or include industrial devices which are part of one or more industrial control systems (ICSs). An example industrial network environment having clients or UEs which are "5G-enabled" industrial devices 220B is shown in the diagram of FIG. 2B. The industrial devices 220B may also be referred to as IoT devices, IIoT devices, cyber assets, security assets, 5G endpoints, etc.

Again, security considerations are important in industrial private 5G networks. Over the years, industrial control systems have experienced a large increase in cyberattacks. The industry has responded to such cybersecurity threats by creating standards to assist users and vendors in the process of securing these systems. These standards may be based on a Purdue model or, more specifically, an Industrial Automation and Control System (IACS) Purdue model.

The IACS Purdue model is a structural model for industrial control system security associated with physical processes, sensors supervisory controls, operations, and logistics. The IACS Purdue model defines different levels of critical infrastructure to be used in production lines and how to secure them: Level 4/5 is the "enterprise" level; Level 3.5 is the "demilitarized zone (DMZ)" level; Level 3 is the "manufacturing operations systems" level; Level 2 is the "control systems" level; Level 1 which is the "intelligent device" level; and Level 0 is the "physical process" level.

Figure 3:
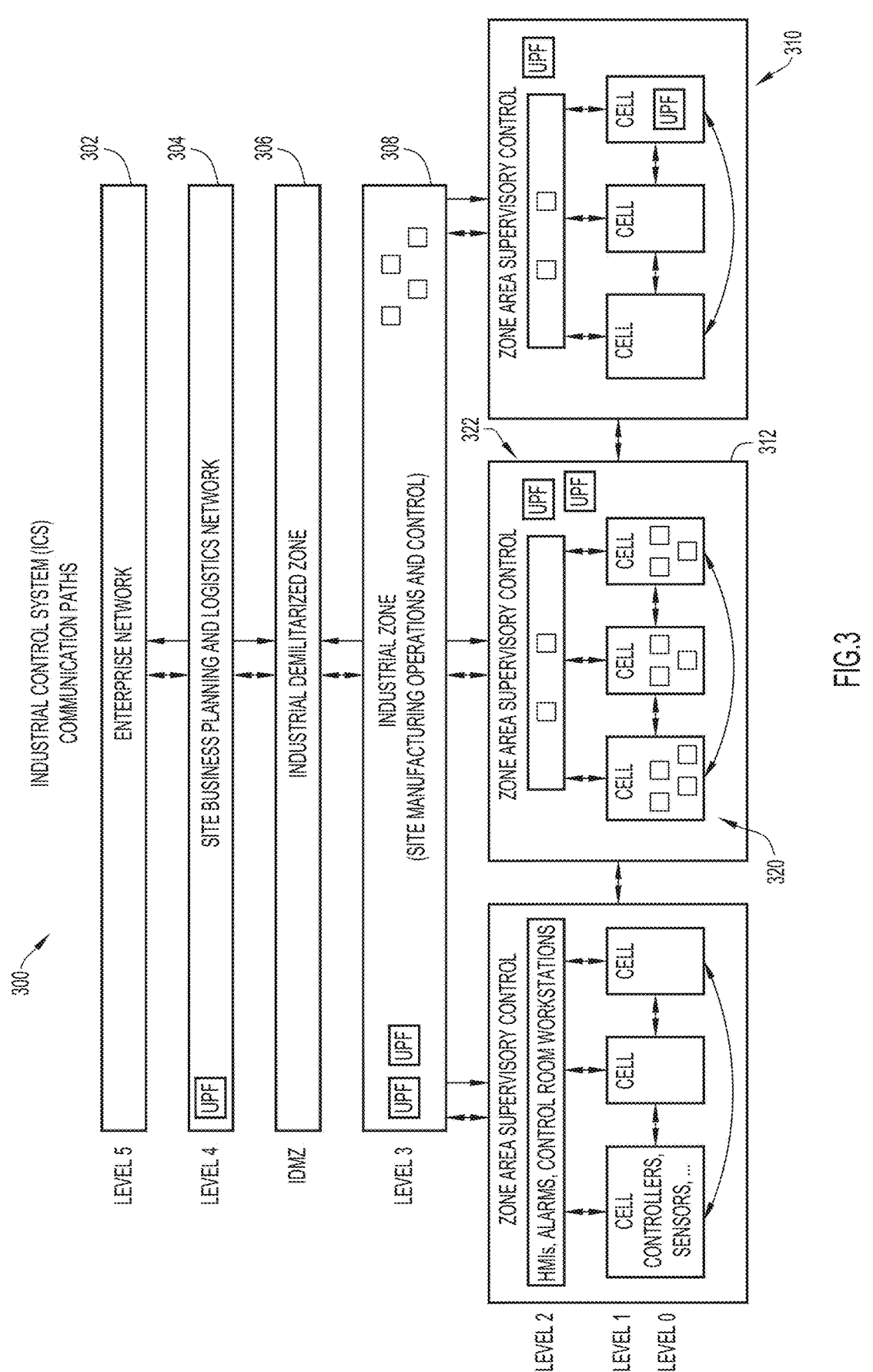
FIG. 3 is an example network architecture implementation based on an Industrial Automation and Control System (IACS) Purdue model, where Industrial Internet of Things (IIoT) networks may be divided into cells and zones, and where each zone may be tied to a particular Operational Technology (OT) process.

To better illustrate, FIG. 3 is a network architecture implementation 300 based on the IACS Purdue model, where IIoT networks are divided into cells and zones, and where each zone is tied to a particular Operational Technology (OT) process. As shown, the network architecture implementation 300 of FIG. 3 includes an Enterprise Network level 302 ("Level 5"); a Site Business Planning and Logistics Network level 304 ("Level 4"); an Industrial Demilitarized Zone level 306 ("IDMZ"); and an Industrial Zone (Site Manufacturing Operations and Control) level 308 ("Level 3"); and a plurality of Zone/Area Supervisory Control areas 310 ("Level 2", "Level 1", and "Level 0"). In the illustrated example, each one of the plurality of Zone/Area Supervisory Control areas 310, such as a Zone/Area Supervisory Control area 312, includes one or more cells 320 having industrial devices and one or more UPFs 322. Cells which are designated at Level 0 or 1 may include various industrial devices, such as controllers, sensors, etc. Level 2 may also include various industrial devices, such as Human Machine Interfaces (HMIs), alarms, control room workstations, etc.

Note there are a number of more specific, key standards available in the market today. International Electrotechnical Commission (IEC) 62443 is a set of security standards for the secure development of IACS. IEC 62443 has been developed to improve the safety, availability, integrity, and confidentiality of components or systems used in industrial automation and control. More specifically, IEC 62443 defines an overall security architecture for OT networks based on "zones" and "conduits." A zone may be defined as a group of devices in need of or having the same (or substantially similar) security requirements, and even perhaps a well-defined (physical) border and the need to communicate with each other. A conduit may be defined as a link between different zones for devices that need to communicate to each other, where the link may implement certain security requirements.

Consider a plant having a first production line for welding and a second production line for painting. Here, there is little or no need for devices in the first production line to communicate with devices in the second production line. Thus, the devices in the first production line may be designated to be in a first zone and the devices in the second production line may be designated to be in a second zone. As described, devices having the same or similar security requirements may be provided in the same zone, where communication with devices in another zone is permitted through a conduit which implements certain security requirements. Segmenting the network in this manner (i.e., into different zones) may contain any damage caused by attacks to the network.

In IEC 62443, technical requirements for products (IEC 62443-4-2) and systems (IEC 62443-3-3) are evaluated based on Security Levels (SLs). These different levels indicate the level of resistance against different classes of attackers. The IEC standard emphasizes that the levels are not suitable for the general classification of products but rather should be evaluated per technical requirement (see, e.g., IEC 62443-1-1). In the IEC 62443 standards, the levels include Security Level 0 which is associated with no special requirement or protection required; Security Level 1 which is associated with protection against unintentional or accidental misuse; Security Level 2 which is associated with protection against intentional misuse by simple means with few resources, general skills and low motivation; Security Level 3 which is associated with protection against intentional misuse by sophisticated means with moderate resources, system-specific knowledge and moderate motivation; and Security Level 4 which is associated with protection against intentional misuse using sophisticated means with extensive resources, system-specific knowledge, and high motivation.

Thus, per the IACS Purdue model, IIoT networks are typically divided into cells and zones, where a zone may be tied to a particular OT process. To support a particular OT process, a variety of different devices, such as sensors, actuators, Programmable Logic Controllers (PLCs), HMIs, etc., will be involved, and different protocols will be in use between such industrial devices. Some of the industrial devices will have strict timing and reliability requirements and some of the industrial devices will not. When using private 5G for such IIoT networks, different IIoT assets and associated applications may have different network service requirements. The network service requirements depend not only on the industrial device, but also where and how the industrial device is used (e.g., per the IACS Purdue model). In addition, a given industrial device may have multiple interfaces and support different protocols with different needs (e.g., real-time process monitoring versus administrator access).

OT customers are typically not networking experts—let alone 5G experts. Hence, expressing these communication needs in networking terms as well as configuring the network to accommodate these needs is a challenge. A more automated solution is needed whereby the network service requirements may be determined automatically or semi-automatically, such that the underlying private 5G network may be configured accordingly.

Techniques and mechanisms as described herein provide an automated or semi-automated solution that enables the "automatic" determining of network service requirements for industrial devices and configuration of the private mobile network to support sessions for the industrial devices.

In general, an automated or semi-automated solution may involve the following:

1. Determining network service requirements for each industrial device and its associated application flows. Network service requirements for an industrial device may include QoS settings (e.g., bandwidth, delay, jitter, etc.), reliability requirements (e.g., packet loss, reordering, duplication, up-time, etc.), monitoring to ensure service agreement specifications (e.g., from SLAs), etc. Note that a derived capability may include a UPF distance.

2. Translating the network service requirements for each industrial device into actual network functions and service parameters, for configuration in the private mobile network. Such processing may include the selection and assignment of a selected network slice having a particular network service requirements configuration for each industrial device. The selected network slice for the industrial device may have a user plane function that is assigned with a zone or security level value that is associated to the industrial device.

To support the above-type processing in a private 5G network, consider a deployment scenario with network slicing and multiple different UPFs deployed in different cells/zones and levels according to the Purdue model. Each network slice may be configured to support a certain set of network service requirements (e.g., ultra-reliable low-latency communication or "URLLC"). In addition, each UPF may be configured to support a certain set of devices and associated application flows (e.g., a set of cells/zones).

In preferred implementations, the techniques involve the assignment of each application flow of an industrial device to a network slice (and associated UPF) that best aligns with the network service requirements of the industrial device/application flow.

In more detailed implementations, the techniques involve the following:

Deployment of a set of UPFs, where each UPF is associated with one or more cells/zones/levels of the Purdue model, information which is registered in the NRF. Each UPF will also have an additional set of services associated with it, as specified by 3GPP (e.g., URLLC).

Definition of a set of network slices that support different network service requirements. Network slices with such different requirements may be defined as follows:

1. Network slices having strict QoS settings that support the network service requirements (e.g., delay, jitter, packet loss, etc.).

2. Network slices having non-strict QoS settings. Here, multiple similar network slices may be needed and each such network slice must be associated with an "anchor" cell/zone for reference.

Definition of an "affinity ranking" between each one of the network slices and each one of the cells/zones. As one example, a value between 1 and 10 indicating how good a given network slice is at supporting its service requirements for industrial devices in that cell/zone (e.g., with "1" being the best). Such a value may be derived (e.g., automatically) by regular probing and SLA monitoring in the underlying network. An affinity ranking may also consider multiple parameters with different weights (e.g., "must have" versus "nice to have", etc.).

Obtaining of device profile information. The device profile information may include information as to the device type, protocol(s) supported, and the Purdue level at which the industrial device sits. Device profile information may be obtained based on one or more of the following:

1. Device profile information may be obtained from network device profiling or network device profile information. Network device profile information may be obtained, for example, from an ISE or a subscriber database of the private 5G network.

2. Device profile information may also be obtained from traffic inspection. Traffic inspection may be provided by, for example, Cisco Cyber Vision (CCV).

In one example, the CCV may identify sensors and actuators using Profinet IO to communicate with a controller. Profinet IO is an industry technical standard for data communication over Industrial Ethernet, designed for collecting data from, and controlling equipment in industrial systems, with a particular strength in delivering data under tight time constraints. The communication has stringent timing and reliability requirements (e.g., leading to the need for URLLC), and the actual bandwidth required may be observed. In some implementations, the CCV may be integrated with the ISE.

Obtaining of application flow information for each industrial device. Application flow information of the industrial device may be obtained based on one or more of the following:

1. Application flow information of an industrial device may be obtained from PLC and/or supervisory control and data acquisition (SCADA) programming information (i.e., expected behavior for a set of industrial devices).

2. Application flow information of an industrial device may also be obtained from traffic inspection (i.e., observed behavior for a set of industrial devices). Again, traffic inspection may be provided by, for example, the CCV.

Analysis of each set of application flows is as follows:

1. Device type and protocols (for application flows) that have specific QoS requirements as they relate to bandwidth, delay, jitter, packet loss, etc. Note that delay, jitter and packet loss requirements may typically be deduced from the device type and the protocol itself, whereas bandwidth requirements may need to be observed.

2. Device type and protocols (for application flows) that do not have specific QoS requirements. For example, a management platform that communicates with a PLC.

Assignment of the industrial devices and applications flows to specific network slices.

1. Select suitable network slices for each industrial device and its application flows based on the network service requirements.

2. Use the affinity rankings of the selected network slices for the industrial devices or cell/zone to determine the best network slice (and UPF) for the industrial device.

As part of the OT process definition, the OT operator can express additional reliability requirements, which may, for example, result in dual-path transmission. Conversely, communication between an HMI and a controller will typically not be real-time; however, it may be in real-time. Automated device and communication profiling may help determine this, which in turn may be translated into underlying network configuration (e.g., URLLC or enhanced Mobile Broadband "eMBB" with specific settings).

Figure 4:
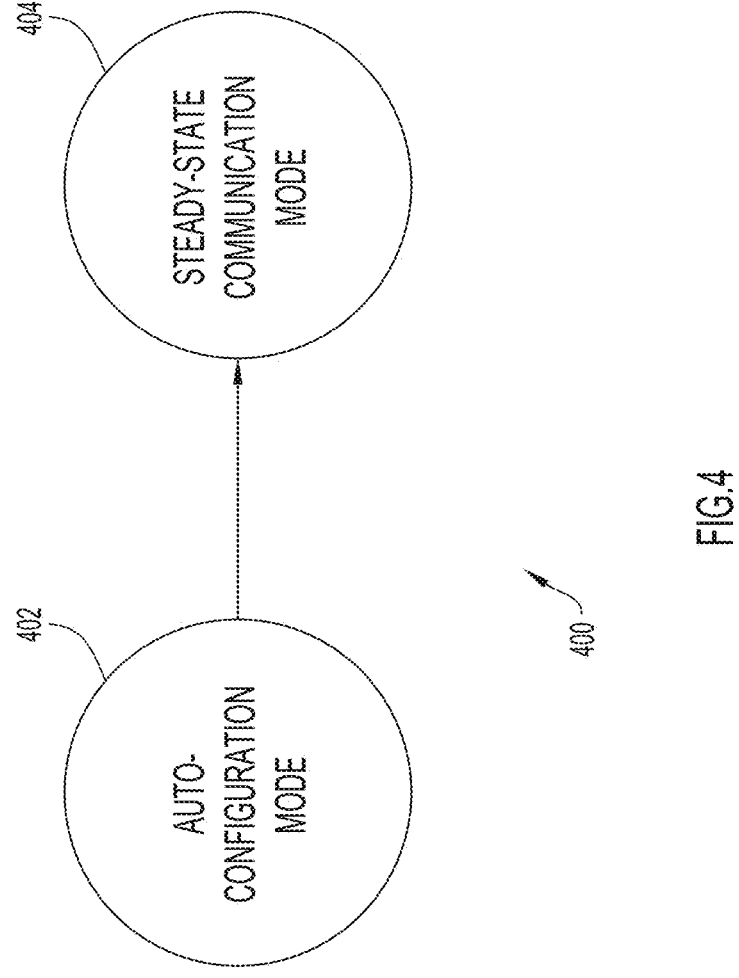
FIG. 4 is a simplified state diagram of operating modes of a private mobile network according to some implementations of the present disclosure.

FIG. 4 is a simplified state diagram 400 of operating modes of a private mobile network (or a portion thereof) according to some implementations of the present disclosure. As illustrated in FIG. 4, the private mobile network (or a portion thereof) may be initially placed in an auto-configuration mode 402 for automatically configuring the private mobile network. In the auto-configuration mode 402, network service requirements for industrial devices operating in the private mobile network are automatically determined, and the private mobile network is then configured based on the network service requirements. Once the private mobile network is automatically configured, the private mobile network (or a portion thereof) may be subsequently placed in a steady-state communication mode 404 for subsequent OT processing for the industrial devices. Processing steps of auto-configuration mode 402 are provided in the description above, in the description of the method of FIG. 5 below, or in combinations or variations of the same.

FIG. 5 is a flowchart 500 for describing a method for use in (e.g., automatically) configuring a private mobile network for communications of an industrial device in the private mobile network according to some implementations of the present disclosure. The method of FIG. 5 may be at least part of the processing involved in the auto-configuration mode 402 of FIG. 4. Here, the private mobile network may be a private 5G network, and operative to provide a set of network slices for various OT processing in relation to industrial devices. The method of FIG. 5 may be performed (at least in part) by one or more controllers for the private mobile network, where each controller may be or include a computing device which includes one or more processors, one or more memory elements coupled to the one or more processors, one or more interfaces to connect to a private mobile network for communication, and instructions stored in the one or more memory elements, where the instructions are executable on the one or more processors for operation for performing the processing/messaging steps of the method(s) as described. The method of FIG. 5 may also be (at least in part) embodied in a computer program product which includes a non-transitory computer readable medium and instructions stored in the non-transitory computer readable medium, where the instructions are executable by the one or more processors of a controller for performing the processing/messaging steps of the method(s) as described. In some implementations, the method of FIG. 5 may utilize some, most, or all of the features described above in relation to the more detailed implementations.

Beginning at a start block 502, the controller may determine network service requirements for an industrial device operative for communications in the private mobile network (step 504 of FIG. 5). In some implementations, the network service requirements for an industrial device may include QoS settings (e.g., bandwidth, delay, jitter, etc.) and reliability requirements (e.g., packet loss, reordering, duplication, up-time, etc.). The controller may select, from the set of network slices, a subset of network slices having network service requirement configurations that most closely support the network service requirements for the industrial device (step 506 of FIG. 5). Here, each network slice of the set of network slices may be associated with an affinity ranking value that is indicative of a service performance of the network slice for industrial device operation in a cell or a zone associated with a zone or security level value that is assigned to the industrial device (step 508 of FIG. 5). The controller may identify, from the subset of network slices, a selected network slice that is associated with a best affinity ranking value for the zone or security level value that is assigned to the industrial device (step 510 of FIG. 5). The controller may then assign the selected network slice and associated service parameters for the communications of the industrial device in the private mobile network (step 512 of FIG. 5).

The method may repeat the determining at step 504, the selecting at step 506, the identifying at step 510, and the assigning at step 512, for each one of a remaining plurality of industrial devices operative in the private mobile network. This repeated processing for additional industrial devices may be executed in a serial-type processing manner or a parallel-type processing manner. In some implementations, the method may be an automatic or semi-automatic method for initially configuring the private mobile network for the communications of the industrial device and the remaining plurality of industrial devices in the private mobile network.

In some implementations, each network slice in the set of network slices includes a plurality of user plane functions, each one of the plurality of user plane functions in each network slice is assigned to a respective one of a plurality of zone or security level values, and the selected network slice includes a user plane function that is assigned with the zone or security level value of the industrial device. In some implementations, the plurality of zone or security level values are defined according to an IACS Purdue model or an IEC 62443 standard. In some implementations of step 512 of FIG. 5, the assigning of the selected network slice may further include assigning the user plane function that is assigned with the zone or security level value of the industrial device for the communications of the industrial device, and configuring the associated service parameters in the user plane function for the communications of the industrial device. In some implementations, identifiers of the selected network slice and/or the associated parameters may be stored in appropriate policy storage (see, e.g., DEVICE/APP ←→ POLICY (SLICE/UPF) as indicated in FIG. 2A), subscriber database, NRF, and/or other NFs, etc.

In some implementations, the method further involves maintaining access to a stored table of a plurality of affinity ranking values. The plurality of affinity ranking values are affinity rankings between each network slice of the set and each one of the plurality of zone or security level values. Here, each affinity ranking value associated with a given network slice and a given zone or security level value may be indicative of the service performance of the given network slice for industrial device operation in a cell or a zone associated with the given zone or security level value. In some implementations, the method further includes automatically deriving the plurality of affinity ranking values for industrial devices, by monitoring of application flows and/or SLA of the industrial devices. The plurality of affinity ranking values may be stored (e.g., in a stored table) and subsequently be utilized (e.g., retrieved as necessary) in the method of FIG. 5. In some implementations of step 510 of FIG. 5, the identifying of the selected network slice may involve identifying the best affinity ranking value associated with the network slices of the selected subset of network slices (e.g., retrieving one or more values from the stored table as needed).

In some implementations of step 504 of FIG. 5, the method may further include obtaining, based on a device type and a protocol of the industrial device, device profile information and application flow information for the industrial device. Here, the determining in step 504 may further involve (e.g., automatically) determining the network service requirements for the industrial device based on the device profile information and the application flow information of the industrial device. In some further implementations, the application flow information may include expected traffic behavior information of the industrial device and observed traffic behavior information of the industrial device. For obtaining the observed traffic behavior information of the industrial device, the method may further include monitoring an application flow of the industrial device for obtaining the observed traffic behavior information of the industrial device.

During the network slice selection process, it is possible that no suitable network slice may be identified. In this case, the network may alert the operator and/or suggest a new network slice definition in order to resolve the issue.

Figure 6:
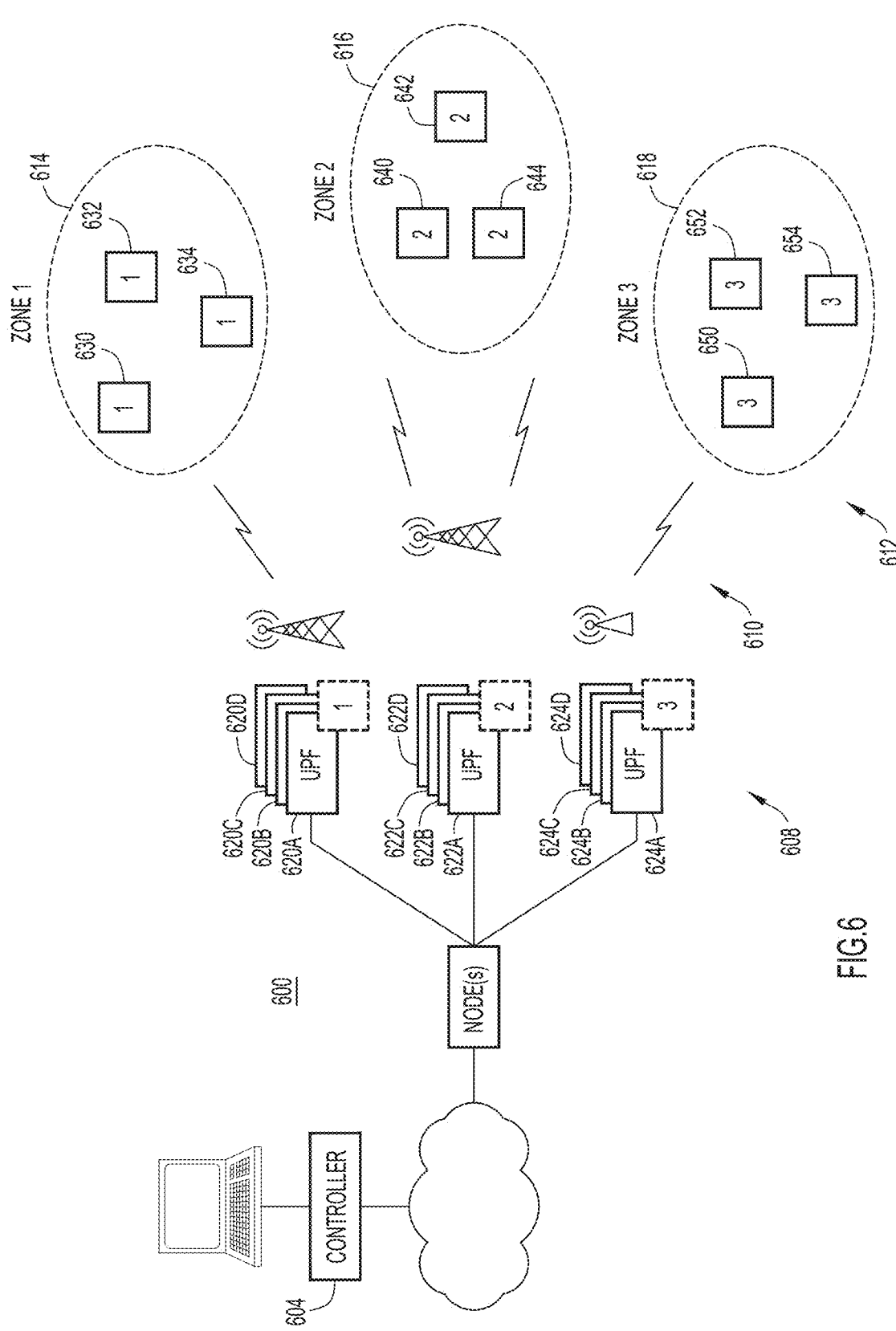
FIG. 6 is an example illustrative representation of relevant nodes of a private 5G network, including one or more controllers for configuring the private 5G network for communications of industrial devices in the private 5G network.

To further illustrate the present techniques (e.g., FIGS. 4 and/or 5), FIG. 6 provides an illustrative representation of relevant nodes of a private 5G network 600 which includes one or more controllers 604 for auto-configuring the private 5G network 600 for communications of a plurality of industrial devices 612 in the private 5G network 600. Private 5G network 600 may have a network infrastructure which is based on the network architecture of FIGS. 1A-1B, 2A-2B, and/or 3. Private 5G network 600 may include a security architecture which is based on IACS Purdue model or other suitable security standard.

In FIG. 6, the plurality of industrial devices 612 (e.g., UEs, 5G endpoints, IoT devices, IIoT devices, etc.) may operate and communicate in the private 5G network 600 via one or more base stations 610 or access points (e.g., gNBs or the like). Each one of the industrial devices 612 may have certain security requirements. Here, each one of the industrial devices 612 may be assigned with a particular zone or security level value. A zone may be defined as a group of devices in need of the same (or substantially similar) security requirements. In some implementations, a zone or security level value may be assigned to each industrial device based on a device type (e.g., an industrial device type of industrial device) or a network type (e.g., an industrial network type of industrial network). As illustrated in FIG. 6, the plurality of industrial devices 612 include a grouping 614 of industrial devices 630, 632, and 634 which are assigned to Zone 1, a grouping 616 of industrial devices 640, 642, and 644 which are assigned to Zone 2, and a grouping 618 of industrial devices 650, 652, and 654 which is assigned to Zone 3.

Private 5G network 600 is operative to make available a set of network slices for various OT processing for the industrial devices 612. In FIG. 6, the set of network slices are represented by a set of network slices A, B, C, and D. In some implementations, each one of network slices A, B, C, and D may have a different network service requirement configuration that is suitable for communications for a particular industrial device.

Each one of the network slices A, B, C, and D may also include a plurality of UPFs, where each UPF of a network slice is associated with a different zone (or different "anchor" zone (Zone 1, 2 or 3). In the illustrative example of FIG. 6, network slice A includes a UPF 620A associated with Zone 1, a UPF 622A associated with Zone 2, and a UPF 624A associated with Zone 3. Network slice B includes a UPF 620B associated with Zone 1, a UPF 622B associated with Zone 2, and a UPF 624B associated with Zone 3. Network slice C includes a UPF 620C associated with Zone 1, a UPF 622C associated with Zone 2, and a UPF 624C associated with Zone 3. Network slice D includes a UPF 620D associated with Zone 1, a UPF 622D associated with Zone 2, and a UPF 624D associated with Zone 3.

One of the plurality of UPFs 608 may be assigned to carry traffic in a session (e.g., a PDU session) for any given one of the industrial devices 612. In some implementations, each one of the UPFs 608 is configured with certain security capabilities or functions, and is assigned with a zone or security level value based on its security capabilities or functions. Alternatively, each one of the UPFs 608 may be configured with all necessary security capabilities or functions, and apply only a selected subset of one or more of these security capabilities or functions in a session (e.g., a PDU session) depending on the zone or security level value associated with the industrial device.

Each network slice A, B, C, and D may also be associated with an affinity ranking value that is indicative of a service performance of the network slice for industrial device operation in a cell or a zone associated with a given zone or security level value. In FIG. 7, an example of an affinity ranking table 700 of a plurality of affinity ranking values is shown, where the affinity ranking values indicate affinity rankings between each network slice in the set of network slices (network slices A, B, C, and D) and each one of a plurality of zone or security level values (Zones 1, 2, 3, 4, and 5). In affinity ranking table 700 of FIG. 7, the range of values is from 1 to 10, where value 1 is used to indicate the "best" service performance and value 10 is used to indicate the "worst" service performance.

With reference back to FIG. 6, consider industrial device 630 of Zone 1 for auto-configuration in the private 5G network 600. Controller 604 may operate to automatically determine network service requirements for industrial device 630. Controller 604 may then select, from the set of network slices A, B, C, and D, a subset of network slices having network service requirement configurations that most closely support the network service requirements for industrial device 630. In the present example, the subset of network slices that are selected based on the network service requirements of industrial device 630 include network slices A and B (and exclude network slice C and D). Again, each network slice A, B, C, and D is associated with an affinity ranking value that is indicative of a service performance of the network slice for industrial device operation in a cell or a zone associated with a given zone or security level value. With reference to affinity ranking table 700 of FIG. 7, network slice A for zone/level 1 of industrial device 630 has an affinity ranking value of 1, whereas network slice B for zone/level 1 of industrial device 630 has an affinity ranking value of 3. As affinity ranking value of 1 is better than affinity ranking value of 3, controller 604 may identify, from the subset of network slices A and B, a selected network slice A which is associated with the best affinity ranking value (i.e., value 1) for the zone or security level value that is assigned to the industrial device 630 (i.e., Zone 1). Controller 604 may then assign the selected network slice A and associated service parameters for the communications of the industrial device 630 in the private 5G network 600.

Next consider industrial device 642 of Zone 2 for auto-configuration in the private 5G network 600. Controller 604 may operate to automatically determine network service requirements for industrial device 642. Controller 604 may then select, from the set of network slices A, B, C, and D, a subset of network slices having network service requirement configurations that most closely support the network service requirements for industrial device 642. In the present example, the subset of network slices that are selected based on the network service requirements of industrial device 642 include network slices B and D (and exclude network slice A and C). Again, each network slice A, B, C, and D is associated with an affinity ranking value that is indicative of a service performance of the network slice for industrial device operation in a cell or a zone associated with a given zone or security level value. Again with reference to affinity ranking table 700 of FIG. 7, network slice B for zone/level 2 of industrial device 642 has an affinity ranking value of 3, whereas network slice D for zone/level 2 of industrial device 642 has an affinity ranking value of 6. As affinity ranking value of 3 is better than affinity ranking value of 6, controller 604 may identify, from the subset of network slices B and D, a selected network slice B which is associated with the best affinity ranking value (i.e., value 3) for the zone or security level value that is assigned to the industrial device 642 (i.e., Zone 2). Controller 604 may then assign the selected network slice B and associated service parameters for the communications of the industrial device 642 in the private 5G network 600.

Figure 8:
FIG. 8 illustrates a hardware block diagram of a computing device that may perform functions associated with operations of a controller according to some implementations of the present disclosure.

FIG. 8 illustrates a hardware block diagram of a computing device 800 that may perform functions associated with operations discussed herein in connection with the techniques described in relation to the above figures. In various embodiments, a computing device, such as computing device 800 or any combination of computing devices 800, may be configured as any entity/entities as discussed for the techniques depicted in connection with the figures in order to perform operations of the various techniques discussed herein. In particular, computing device 800 may perform operations of a controller for operation in accordance with the method of FIGS. 4 and/or 5 and/or associated techniques and mechanisms described herein.

In at least one embodiment, computing device 800 may include one or more processor(s) 802, one or more memory element(s) 804, a bus 806, storage 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 808 is/are configured to store data, information, software, and/or instructions associated with computing device 800, and/or logic configured for memory element(s) 804 and/or storage 808. For example, any logic described herein (e.g., control logic 820) can, in various embodiments, be stored for computing device 800 using any combination of memory element(s) 804 and/or storage 808. Note that in some embodiments, storage 808 can be consolidated with memory element(s) 804 (or vice versa), or can overlap/exist in any other suitable manner.

In at least one embodiment, bus 806 can be configured as an interface that enables one or more elements of computing device 800 to communicate in order to exchange information and/or data. Bus 806 can be implemented with any architecture designed for passing control, data and/or information between processors, memory elements/storage, peripheral devices, and/or any other hardware and/or software components that may be configured for computing device 800. In at least one embodiment, bus 806 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 808 can store data, software, code, instructions (e.g., processor instructions), logic, parameters, combinations thereof, and/or the like used for operations described herein. This includes memory element(s) 804 and/or storage 808 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Thus, techniques and mechanisms have been described herein, for automatically determining network service requirements for industrial devices operative in a private mobile network and configuring the private mobile network based on the network service requirements for subsequent OT processing in relation to the industrial devices.

In one illustrative example, a method is described for configuring a private mobile network for communications of an industrial device in the private mobile network which is operative to provide a set of network slices for OT processing in relation to industrial devices. The method may include determining network service requirements for an industrial device operative for communications in the private mobile network; selecting, from the set of network slices, a subset of network slices having network service requirement configurations that most closely support the network service requirements for the industrial device, wherein each network slice of the set is associated with an affinity ranking value that is indicative of a service performance of the network slice for industrial device operation in a cell or a zone associated with a zone or security level value that is assigned to the industrial device; identifying, from the subset of network slices, a selected network slice that is associated with a best affinity ranking value for the zone or security level value that is assigned to the industrial device; and assigning the selected network slice and associated service parameters for the communications of the industrial device in the private mobile network.

In some implementations, each network slice in the set of network slices includes a plurality of user plane functions, each one of the plurality of user plane functions in each network slice is assigned to a respective one of a plurality of zone or security level values, and the selected network slice includes a user plane function that is assigned with the zone or security level value of the industrial device. In some further implementations, the assigning of the selected network slice further includes assigning the user plane function that is assigned with the zone or security level value of the industrial device for the communications of the industrial device; and configuring the associated service parameters in the user plane function for the communications of the industrial device. In yet further implementations, the plurality of zone or security level values are defined according to an IACS Purdue model or an IEC 62443 standard.

In some implementations, the method further involves maintaining access to a stored table of a plurality of affinity ranking values which comprise affinity rankings between each one of the set of network slices and each one of a plurality of zone or security level values. Each affinity ranking value associated with a given network slice and a given zone or security level value may be indicative of the service performance of the given network slice for industrial device operation in a cell or a zone associated with the given zone or security level value.

In some implementations, the method may further include obtaining, based on a device type and a protocol of the industrial device, device profile information and application flow information for the industrial device, where the determining may further involve determining the network service requirements for the industrial device based on the device profile information and the application flow information of the industrial device. In some further implementations, the application flow information may include expected traffic behavior information of the industrial device and observed traffic behavior information of the industrial device. In yet further implementations, the method may further include monitoring an application flow of the industrial device for obtaining the observed traffic behavior information of the industrial device.

In some implementations, the method may include repeating the determining, the selecting, the identifying, and the assigning, for each one of a remaining plurality of industrial devices operative in the private mobile network. In some further implementations, the method may be an automatic or semi-automatic method for initially configuring the private mobile network for the communications of the industrial device and the remaining plurality of industrial devices in the private mobile network.

In relation to the above-described methods, a computing device may comprise one or more processors; one or more memory elements coupled to the one or more processors; one or more interfaces to connect to a mobile network for communication; instructions stored in the one or more memory elements, where the instructions are executable on the one or more processors for operation as a controller, including for performing the processing/messaging steps of the method(s) as described. In addition, a computer program product may comprise a non-transitory computer readable medium and instructions stored in the non-transitory computer readable medium, where the instructions are executable by one or more processors of controller for performing the processing/messaging steps of the method(s) as described.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), VLAN, wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, IoT network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combined multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
at one or more controllers for configuring a private mobile network which is operative to provide a set of network slices for operational technology (OT) processing for industrial devices,
   determining network service requirements for an industrial device operative for communications in the private mobile network;
   selecting, from the set of network slices, a subset of network slices having network service requirement configurations that most closely support the network service requirements for the industrial device;
   wherein each network slice of the set is associated with an affinity ranking value that is indicative of a service performance of the network slice for industrial device operation in a cell or a zone associated with a zone or security level value that is assigned to the industrial device;
   identifying, from the subset of network slices, a selected network slice that is associated with a best affinity ranking value for the zone or security level value that is assigned to the industrial device; and
   assigning the selected network slice and associated service parameters for the communications of the industrial device in the private mobile network.

2. The method of claim 1, wherein:
each network slice in the set of network slices includes a plurality of user plane functions,
each one of the plurality of user plane functions in each network slice is assigned to a respective one of a plurality of zone or security level values, and
the selected network slice includes a user plane function that is assigned with the zone or security level value of the industrial device.

3. The method of claim 2, wherein the assigning further comprises:
   assigning the user plane function that is assigned with the zone or security level value of the industrial device for the communications of the industrial device; and
   configuring the associated service parameters in the user plane function for the communications of the industrial device.

4. The method of claim 2, wherein the plurality of zone or security level values are defined according to an Industrial Automation and Control System (IACS) Purdue model or an International Electrotechnical Commission (IEC) 62443 standard.

5. The method of claim 1, further comprising:
at the one or more controllers,
   maintaining access to a stored table of a plurality of affinity ranking values which comprise affinity rankings between each one of the set of network slices and each one of a plurality of zone or security level values.

6. The method of claim 1, further comprising:
obtaining, based on a device type and a protocol of the industrial device, device profile information and application flow information for the industrial device,
wherein the determining further comprises determining the network service requirements for the industrial device based on the device profile information and the application flow information of the industrial device.

7. The method of claim 6, wherein the application flow information comprises expected traffic behavior information of the industrial device and observed traffic behavior information of the industrial device, the method further comprising:
   monitoring an application flow of the industrial device for obtaining the observed traffic behavior information of the industrial device.

8. The method of claim 1, further comprising:
repeating the determining, the selecting, the identifying, and the assigning, for each one of a remaining plurality of industrial devices operative in the private mobile network.

9. The method of claim 8, wherein the method comprises an automatic or semi-automatic method for configuring the private mobile network for the communications of the industrial device and the remaining plurality of industrial devices in the private mobile network.

10. A computing device comprising:
one or more processors;
one or more memory elements coupled to the one or more processors;
one or more interfaces to connect to a private mobile network for communication;
instructions stored in the one or more memory elements, the instructions being executable on the one or more processors for configuring a private mobile network which is operative to provide a set of network slices for operational technology (OT) processing for industrial devices,
   determining network service requirements for an industrial device operative for communications in the private mobile network;
   selecting, from the set of network slices, a subset of network slices having network service requirement configurations that most closely support the network service requirements for the industrial device;
   wherein each network slice of the set is associated with an affinity ranking value that is indicative of a service performance of the network slice for industrial device operation in a cell or a zone associated with a zone or security level value that is assigned to the industrial device;

identifying, from the subset of network slices, a selected network slice that is associated with a best affinity ranking value for the zone or security level value that is assigned to the industrial device; and assigning the selected network slice and associated service parameters for the communications of the industrial device in the private mobile network.

11. The computing device of claim 10, wherein:

each network slice in the set of network slices includes a plurality of user plane functions, each one of the plurality of user plane functions in each network slice is assigned to a respective one of a plurality of zone or security level values, and the selected network slice includes a user plane function that is assigned with the zone or security level value of the industrial device.

12. The computing device of claim 11, wherein the instructions are executable on the one or more processors for the assigning by:

assigning the user plane function that is assigned with the zone or security level value of the industrial device for the communications of the industrial device; and configuring the associated service parameters in the user plane function for the communications of the industrial device.

13. The computing device of claim 11, wherein the plurality of zone or security level values are defined according to an Industrial Automation and Control System (IACS) Purdue model or an International Electrotechnical Commission (IEC) 62443 standard.

14. The computing device of claim 10, wherein the instructions are executable on the one or more processors further for:

maintaining access to a stored table of a plurality of affinity ranking values which comprise affinity rankings between each one of the set of network slices and each one of a plurality of zone or security level values.

15. The computing device of claim 10, wherein the instructions are executable on the one or more processors further for:

obtaining, based on a device type and a protocol of the industrial device, device profile information and application flow information for the industrial device, and wherein the determining further comprises determining the network service requirements for the industrial device based on the device profile information and the application flow information of the industrial device.

16. A computer program product comprising:

a non-transitory computer readable medium; and instructions stored in the non-transitory computer readable medium;

the instructions being executable on one or more processors of a controller for configuring a private mobile network which is operative to provide a set of network slices for operational technology (OT) processing for industrial devices, including operation for:

determining network service requirements for an industrial device operative for communications in the private mobile network;

selecting, from the set of network slices, a subset of network slices having network service requirement configurations that most closely support the network service requirements for the industrial device;

wherein each network slice of the set is associated with an affinity ranking value that is indicative of a service performance of the network slice for industrial device operation in a cell or a zone associated with a zone or security level value that is assigned to the industrial device;

identifying, from the subset of network slices, a selected network slice that is associated with a best affinity ranking value for the zone or security level value that is assigned to the industrial device; and assigning the selected network slice and associated service parameters for the communications of the industrial device in the private mobile network.

17. The computer program product of claim 16, wherein the instructions are executable on the one or more processors for the assigning by:

assigning a user plane function that is assigned with the zone or security level value of the industrial device for the communications of the industrial device; and configuring the associated service parameters in the user plane function for the communications of the industrial device.

18. The computer program product of claim 16, wherein the instructions are executable on the one or more processors further for:

maintaining access to a stored table of a plurality of affinity ranking values which comprise affinity rankings between each one of the set of network slices and each one of a plurality of zone or security level values.

19. The computer program product of claim 16, wherein the instructions are executable on the one or more processors further for:

obtaining, based on a device type and a protocol of the industrial device, device profile information and application flow information for the industrial device, wherein the determining further comprises determining the network service requirements for the industrial device based on the device profile information and the application flow information of the industrial device.

20. The computer program product of claim 19, wherein the application flow information comprises expected traffic behavior information of the industrial device and observed traffic behavior information of the industrial device, and the instructions are executable on the one or more processors further for:

monitoring an application flow of the industrial device for obtaining the observed traffic behavior information of the industrial device.

* * * * *